(12) United States Patent
Shirley-Smith

(10) Patent No.: US 11,800,923 B1
(45) Date of Patent: Oct. 31, 2023

(54) ADJUSTABLY POSITIONABLE HANGING RECLINER

(71) Applicant: Alex Shirley-Smith, London (GB)

(72) Inventor: Alex Shirley-Smith, London (GB)

(73) Assignee: TENTSILE LTD, London (GB)

( * ) Notice: Subject to any disclaimer, the term of this patent is extended or adjusted under 35 U.S.C. 154(b) by 0 days.

(21) Appl. No.: 17/875,621

(22) Filed: Jul. 28, 2022

(51) Int. Cl.
*A45F 3/26* (2006.01)
*A47C 1/02* (2006.01)
*A63G 9/00* (2006.01)
*A47C 3/025* (2006.01)
*A01M 31/02* (2006.01)

(52) U.S. Cl.
CPC ............ *A45F 3/26* (2013.01); *A47C 1/02* (2013.01); *A47C 3/0255* (2013.01); *A63G 9/00* (2013.01); *A01M 31/025* (2013.01)

(58) Field of Classification Search
CPC .......... A45F 3/26; A47C 1/02; A47C 3/0255; A63G 9/00; A01M 31/025
USPC ...................................... 297/278–280; 5/125
See application file for complete search history.

(56) References Cited

U.S. PATENT DOCUMENTS

| | | | |
|---|---|---|---|
| 370,222 A | 9/1887 | Travers | |
| 371,065 A * | 10/1887 | Hendrickson | A45F 3/26 297/423.26 |
| 402,469 A | 4/1889 | Messmore | |
| 427,900 A * | 5/1890 | Pearson | A47C 1/035 5/124 |
| 659,300 A * | 10/1900 | Hahn | A47C 3/0255 297/277 |
| 737,276 A * | 8/1903 | Rote | A47C 1/035 297/130 |
| 787,556 A * | 4/1905 | Bottgar | A45F 3/26 297/278 |
| 831,167 A * | 9/1906 | Kurfees et al. | F21V 21/38 248/320 |
| 953,591 A * | 3/1910 | Bringham | A47C 1/035 297/69 |
| 998,689 A | 7/1911 | Irvine | |
| 1,173,654 A * | 2/1916 | Eaton | A47C 3/0255 297/277 |
| 1,189,393 A * | 7/1916 | Shaw | A47D 13/105 297/277 |
| 4,221,429 A * | 9/1980 | Wade | A45F 3/26 297/277 |
| 4,478,409 A * | 10/1984 | Eads | A63G 9/00 297/278 |

(Continued)

OTHER PUBLICATIONS

"Forclaz A200, Easy-Adjust Hiking Pole," Decathlon.com. https://www.dropbox.com/s/b12aph8qbcsw0xz/Screenshot%202022-05-19%20at%2012-19-38%20Forclaz%20A200%20Easy-Adjust%20Hiking%20Pole.png?dl=0 [Date accessed: May 19, 2022].

*Primary Examiner* — Robert Canfield
(74) *Attorney, Agent, or Firm* — Michael J. Feigin, Esq.; Feigin and Fridman LLC

(57) ABSTRACT

A recliner system, including a suspension point adapted to be mounted onto an upright anchor and to extend outwardly therefrom. The recliner system further includes a support platform and a plurality of cords, each attached to the support platform at two attachment points and suspended from the suspension point. The support platform is adjustable between an upright position and a reclined position by pulling on at least a subset of the plurality of cords.

11 Claims, 8 Drawing Sheets

(56) References Cited

U.S. PATENT DOCUMENTS

| | | | | |
|---|---|---|---|---|
| 4,763,942 A | * | 8/1988 | Lyon | A22B 5/06 294/81.5 |
| 4,838,609 A | * | 6/1989 | Christensen | A47C 3/0255 297/277 |
| 4,886,143 A | * | 12/1989 | Dubroc | A01M 31/02 182/187 |
| 5,058,951 A | * | 10/1991 | Thiel | A47C 3/0255 248/370 |
| 5,263,675 A | * | 11/1993 | Roberts | A01M 31/00 248/219.4 |
| 5,427,344 A | * | 6/1995 | Beauchemin | A44B 11/125 182/187 |
| 5,482,105 A | | 9/1996 | Rude | |
| 5,788,327 A | * | 8/1998 | Gregory | A47C 3/0255 297/423.3 |
| D418,314 S | * | 1/2000 | Hines | D6/347 |
| 6,019,427 A | * | 2/2000 | Combest | B60P 3/36 297/277 |
| 6,364,412 B1 | | 4/2002 | Crawford | |
| 7,870,933 B2 | * | 1/2011 | McInnes | A45F 3/24 5/120 |
| 7,909,348 B2 | | 3/2011 | Klieber | |
| 8,491,053 B2 | * | 7/2013 | Stringer | A01M 31/025 135/90 |
| 9,999,232 B1 | * | 6/2018 | Poland | A22B 5/06 |
| D882,983 S | | 5/2020 | Dick | |
| 11,297,950 B2 | * | 4/2022 | Sabbagh | A47C 3/023 |
| 2003/0209927 A1 | * | 11/2003 | Nussbaum | A47C 3/0255 297/273 |
| 2004/0050505 A1 | | 3/2004 | Rasmussen | |
| 2014/0310872 A1 | | 10/2014 | Rozman | |

\* cited by examiner

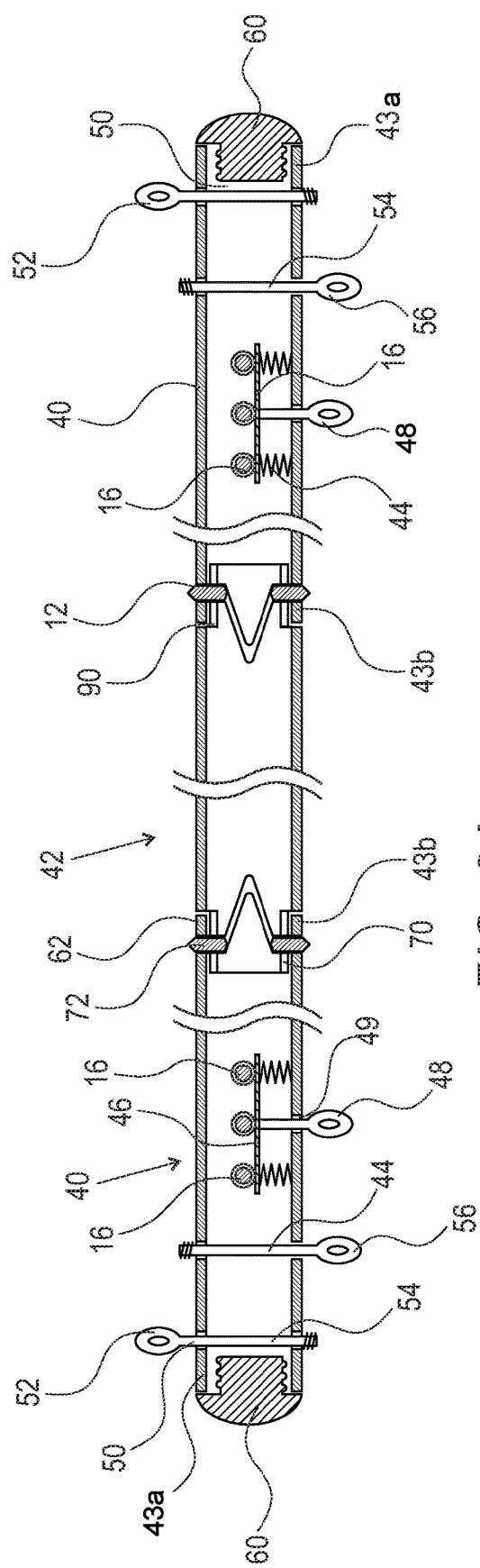
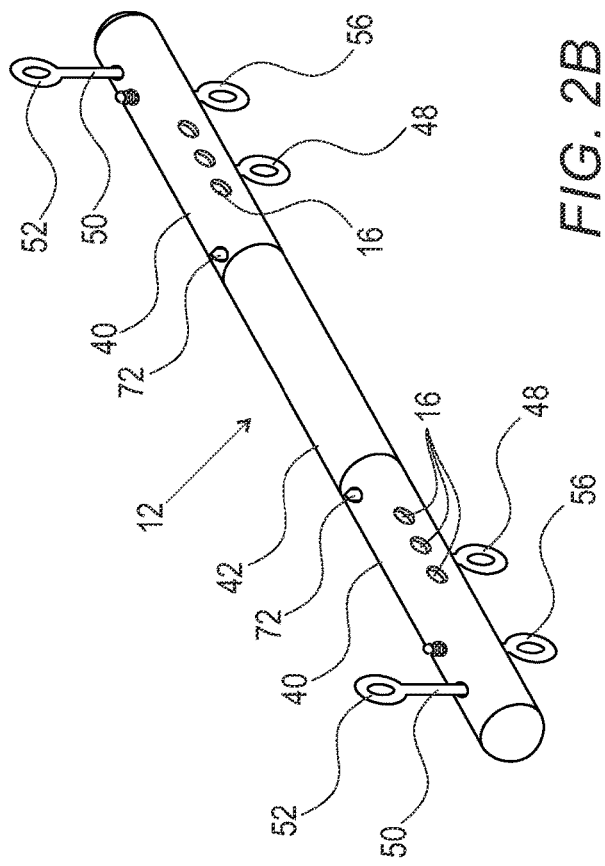
FIG. 2A
FIG. 2B

ADJUSTABLY POSITIONABLE HANGING RECLINER

FIELD OF THE DISCLOSED TECHNOLOGY

The present disclosure relates generally to recliners, and more specifically to suspended recliners which can be transformed between two or more positions.

BACKGROUND OF THE DISCLOSED TECHNOLOGY

Hammocks and swings are often used by people wishing to relax in nature. Typically, such hammocks and swings are hung from trees, or otherwise suspended from one or more suspension points, to facilitate swinging above the ground.

One disadvantage of hammocks and swings is that they are always in the same position, whether recumbent or upright. Additionally, it is often hard to get on or off hammocks and swings, because of the awkward position in which one needs to be when getting on or off.

Several prior art references have proposed suspended recliners, which can transition from an upright position to a recumbent position. However, in these prior art references, the user must manipulate their body weight in order to transition the recliner between positions. For example, the user must slide upward on the seat to make it recline, or must use their legs to cause a leg rest to be raised.

There remains a need in the art for a recliner that can be connected to one or more suspension points, and in which the transition between positions is by way of adjusting cords, which can be controlled by the user's hands.

SUMMARY OF THE DISCLOSED TECHNOLOGY

In accordance with an embodiment of the disclosed technology, there is provided a recliner system, including a suspension point adapted to be mounted onto an upright anchor and to extend outwardly therefrom. A support platform has a plurality of cords, each attached to the support platform at two attachment points. The plurality of cords are suspended from the suspension point. The support platform is adjustable between an upright position and a reclined position by pulling on at least a subset of the plurality of cords.

In some embodiments, the suspension point includes a suspension pole adapted to be substantially perpendicular to the upright anchor when mounted thereon.

In some embodiments, the suspension pole is mounted onto the anchor by a guiding tube, attached to a bracket wrapped around the anchor.

In some embodiments, the suspension pole is mounted onto the anchor by suspension cords, adapted to be wrapped around the anchor or connected to brackets wrapped around the anchor.

In some embodiments, the plurality of cords extend through bores in the suspension pole, from one side of the suspension pole to the other, such that a segment of the cords disposed within the suspension pole is substantially perpendicular to the suspension pole.

In some embodiments, the pulling on the subset of the plurality of cords includes, for each cord in the subset, changing a ratio between a length of the cord on one side of the suspension pole and a length of the cord on the opposing side of the suspension pole.

In some embodiments, the suspension pole includes first and second end portions, each including some of the bores and having some of the cords extending therethrough.

In some embodiments, the first end portion is slidably disposed within the second end portion, and is adapted to be slid therein to modify a length of the suspension pole.

In some embodiments, each of the first and second end portions is connected to an end of a center portion. In some embodiments, the center portion is attached to the first and second end portions by snap fit engagement.

In some embodiments, the suspension pole includes a tube having a spring loaded plate disposed therein, the spring loaded plate being adapted to push each cord past the corresponding bore through which it passes, in a direction perpendicular to a longitudinal axis of the suspension pole, thereby crimping the cord between the spring loaded plate and an internal circumference of the suspension pole.

In some embodiments, the recliner system further including a handle, functionally associated with the spring loaded plate, wherein, when the user pulls the handle away from the suspension pole, the plate is pulled away from the corresponding bore and the cord is released from the crimping, for adjustment thereof.

In some embodiments, in the upright position, a back portion of the support platform is substantially perpendicular to a seat portion of the support platform. In some embodiments, in the reclined position, the entire support platform is in substantially the same plane.

In accordance with an embodiment of the disclosed technology, there is provided a method of mounting a recliner onto an upright anchor. The method includes mounting a suspension pole onto the upright anchor, such that the suspension pole is substantially perpendicular to the anchor. A plurality of cords are threaded through bores in the suspension pole, such that portions of the cords extending through the suspension pole are substantially perpendicular to a longitudinal axis of the suspension pole. Each of the plurality of cords is attached to a support platform at two locations of the support platform. For at least one cord of the plurality of cords, modifying a ratio between a length of the cord disposed between the pole and a first location on the support platform, and a length of the cord disposed between the pole and a second location on the support platform, thereby to adjust a position of the support platform.

In accordance with an embodiment of the disclosed technology, there is provided a method of adjusting a position of a support platform of a recliner suspended from a suspension pole by a plurality of cords extending through bores in the suspension pole. The method includes pulling a handle away from the suspension pole, the handle being functionally associated with a plate securing a position of at least some of the cords relative to the suspension pole, such that the pulling of the handle releases the cords relative to the suspension pole. While the handle is pulled away from the suspension pole, pulling on at least one cord of the plurality of cords, to adjust a position of the support platform. Subsequently, releasing the handle, thereby to secure the cords and the support platform in their adjusted position.

In some embodiments, the pulling on the at least one cord includes adjusting a position of the support platform between a reclined position and an upright position.

"Substantially" and "substantially shown," for purposes of this specification, are defined as "at least 90%," or as otherwise indicated. Any device may "comprise" or "consist of" the devices mentioned there-in, as limited by the claims.

It should be understood that the use of "and/or" is defined inclusively such that the term "a and/or b" should be read to include the sets: "a and b," "a or b," "a," "b."

BRIEF DESCRIPTION OF THE DRAWINGS

FIGS. 2A and 2B are, respectively, a sectional illustration and a perspective illustration of a suspension pole for suspending an adjustable recliner according to embodiments of the disclosed technology.

DETAILED DESCRIPTION OF EMBODIMENTS OF THE DISCLOSED TECHNOLOGY

The disclosed technology relates to a recliner system, including a suspension point adapted to be mounted onto an upright anchor and to extend outwardly therefrom. A support platform has a plurality of cords, each attached to the support platform at two attachment points. The plurality of cords are suspended from the suspension point. The support platform is adjustable between an upright position and a reclined position by pulling on at least a subset of the plurality of cords.

Embodiments of the disclosed technology will become clearer in view of the following description of the Figures.

Figure 1A:
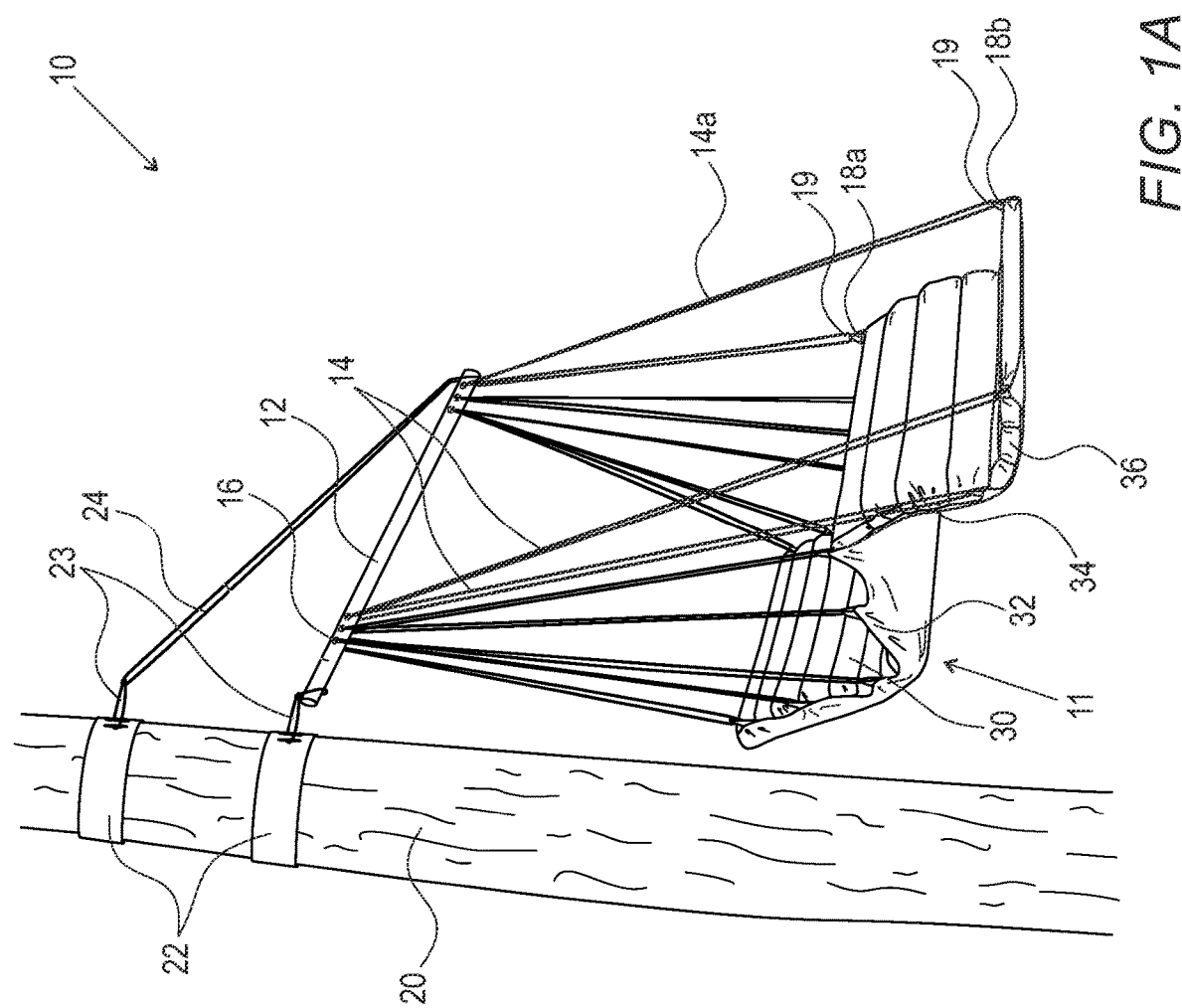
FIGS. 1A and 1B are schematic pictures of an adjustable recliner according to embodiments of the disclosed technology, in an upright position and in a reclined position, respectively.
Figure 1B:
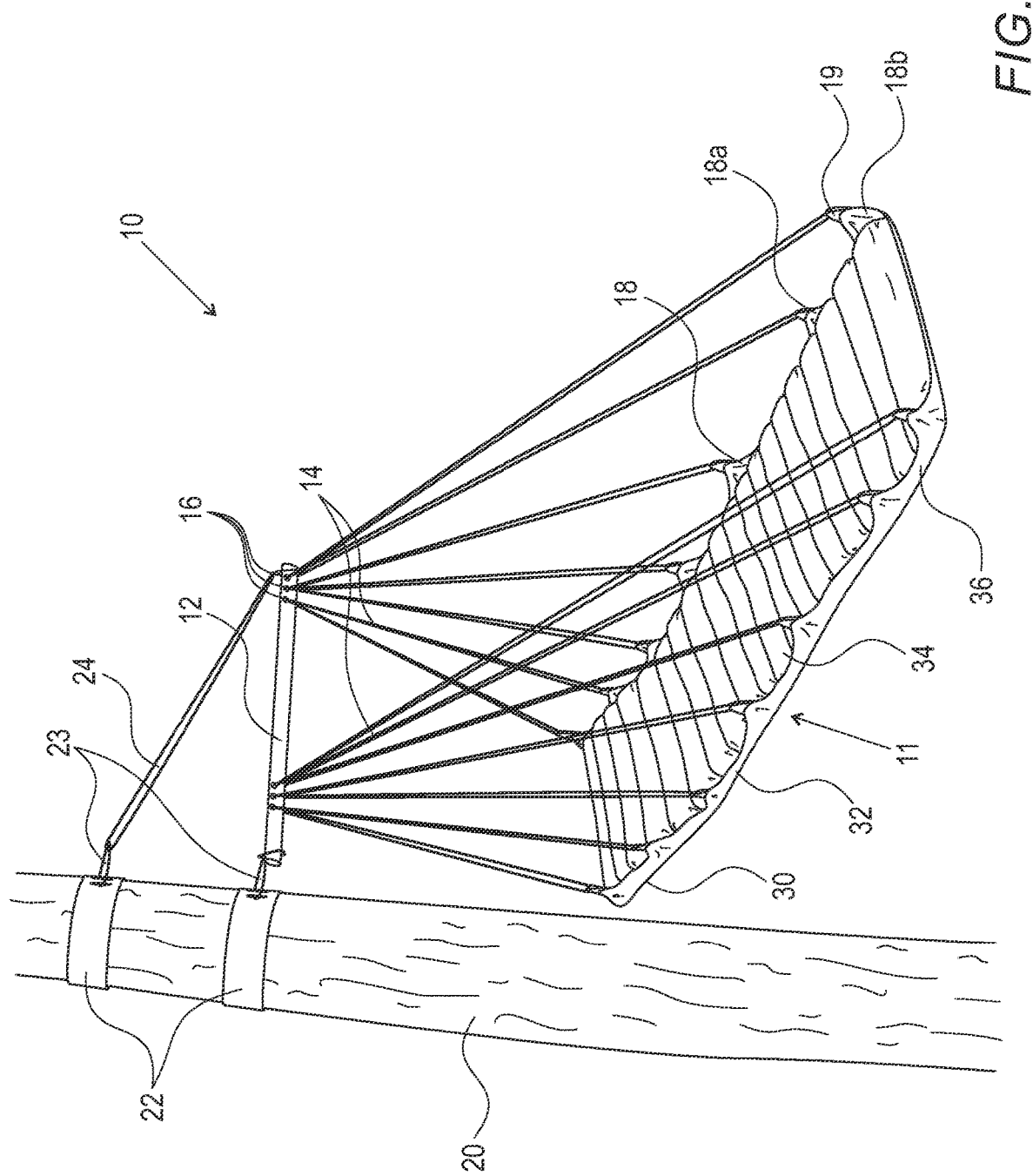

FIGS. 1A and 1B are schematic pictures of an adjustable recliner 10 according to embodiments of the disclosed technology, in an upright position and in a reclined position, respectively. The adjustable recliner 10 includes a support surface (or "support platform") 11 hanging from a suspension pole 12 by a plurality of cords 14.

Each of cords 14 extends through bores 16 in suspension pole 12, from one side of the pole to the other. Each of cords 14 engages support surface 11 at two contact locations 18. For example, cord 14a engages support surface 11 at contact locations 18a and 18b. In some embodiments, each contact location 18 comprises a loop 19 through which cord 14 is threaded. In total, there are at least four contact locations 18 on support surface 11.

Suspension pole 12 is hanging from an anchor 20, which may be, for example, the trunk of a tree. In the illustrated embodiment, two clamps 22 are wrapped around anchor 20. Each clamp 22 includes an anchoring point 23, through which is threaded a suspension cord 24. Suspension cords 24 hold suspension pole 12 to clamps 22 and to anchor 20. Typically, lengths of suspension cords 24 are selected such that suspension pole 12 is substantially parallel to a reference surface, such as the ground, or is substantially perpendicular to the anchor 20.

In FIG. 1A, the recliner is shown in an upright position, in which a back portion of support surface 11, indicated by reference numeral 30, is at substantially a right angle to a seat portion of the support surface, indicated by reference numeral 32. In some embodiments, when recliner 10 is in the upright position of a leg portion of support surface 11, indicated by reference numeral 34 is substantially perpendicular to seat portion 32. In some embodiments, support surface 11 may further includes a foot support portion 36, which, in FIG. 1A, is substantially perpendicular to leg portion 34.

In some embodiments, in the upright position of recliner 10, back portion 30 is substantially vertical, and seat portion 32 is substantially horizontal, relative to earth's gravity.

In FIG. 1B, the recliner is shown in a reclined, or recumbent position, such that all of portions 30, 32, 34, and 36 are substantially within in a single plane. In some embodiments, the single plane is substantially horizontal, relative to earth's gravity.

It will be readily appreciated by people of skill in the art that recliner 10 may be in many other positions. For example, in another position, back portion 30 and seat portion 32 may be as shown in FIG. 1A, while leg portion 34 and foot support portion 36 may be disposed beneath, and substantially parallel to, seat portion 32. As another example, an obtuse angle may be formed between back portion 30 and seat portion 32.

It is a particular feature of the disclosed technology that recliner 10 is transitioned between different positions thereof, by pulling on cords 14, thereby changing the length of cords 14 on opposing sides of suspension pole 12. For example, in order to lower foot support 36 in FIG. 1A, one might pull cord 14a toward contact location 18b, thereby extending the length of cord 14a between suspension pole 12 and contact location 18b. Pulling of the different cords 14 to different extents results in a plurality of positions of recliner 10, adjustable by the user for their convenience and comfort.

Reference is now made to FIGS. 2A and 2B which are, respectively, a sectional illustration and a perspective illustration of suspension pole 12 for suspending adjustable recliner 10 according to embodiments of the disclosed technology.

Suspension pole 12 comprises a hollow tubular structure, and includes a pair of end portions 40 and a center portion 42.

The following description relates to one of end portions 40, and is symmetrically applicable to the other end portion 40. End portion 40 comprises a tube, having a first end 43a and a second end 43b. End portion 40 includes a plurality of bores 16 for passage of cords 14 therethrough.

One or more compression springs 44 are anchored to an internal surface of end portion 40, such that a longitudinal axis of compression springs 44 is substantially perpendicular to an axis extending through bores 16 on opposing sides of the end portion. A plate 46 is attached to springs 44, and is pushed by springs 44 toward bores 16. A pull-ring 48 is attached to a surface of plate 46 adjacent or between spring(s) 44, and extends out of a bore 49 in end portion 40, such that the ring thereof is accessible to a user. A longitudinal axis of pull ring 48 is substantially parallel to a longitudinal axis of spring(s) 44.

Figure 4B:
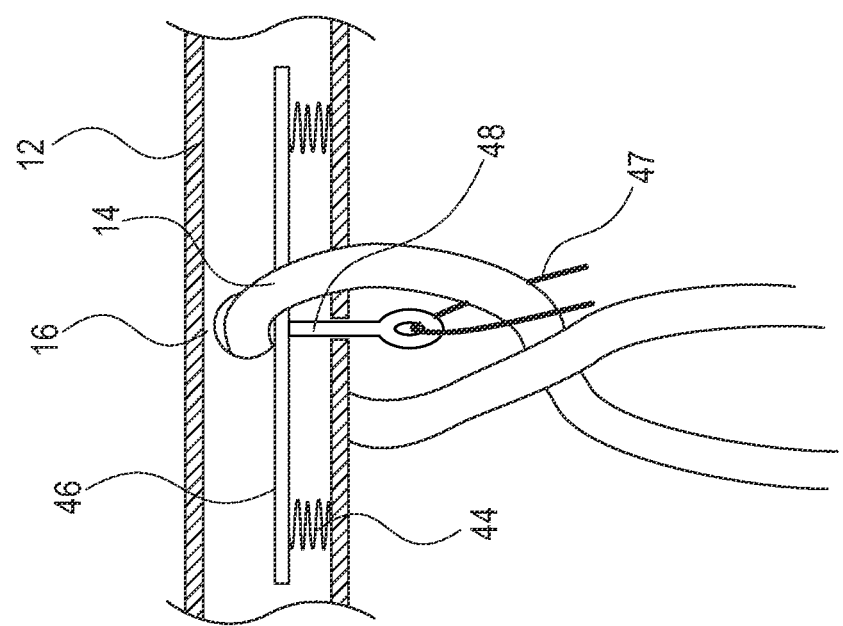
FIGS. 4A and 4B are, respectively, a schematic perspective view illustration and a sectional illustration of suspension cords extending through a section of the suspension pole of FIGS. 2A to 3, according to embodiments of the disclosed technology.
Figure 4A:
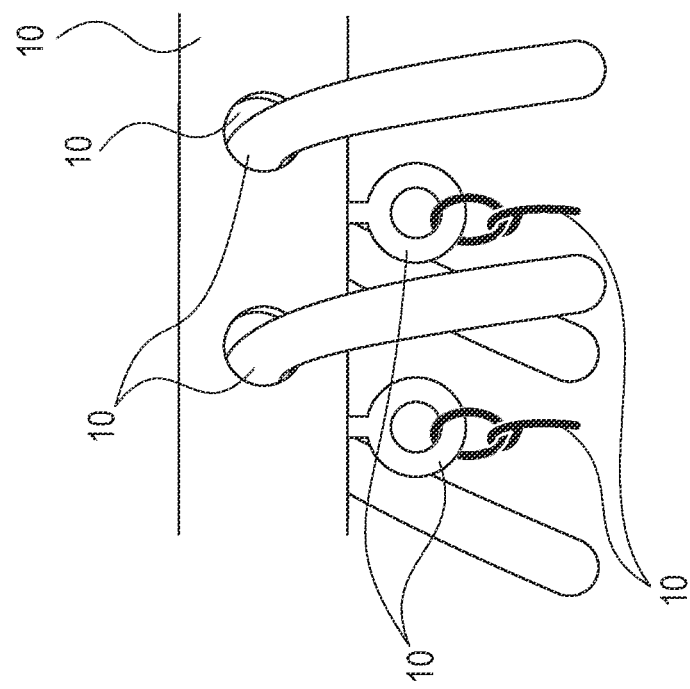
Figure 5A:
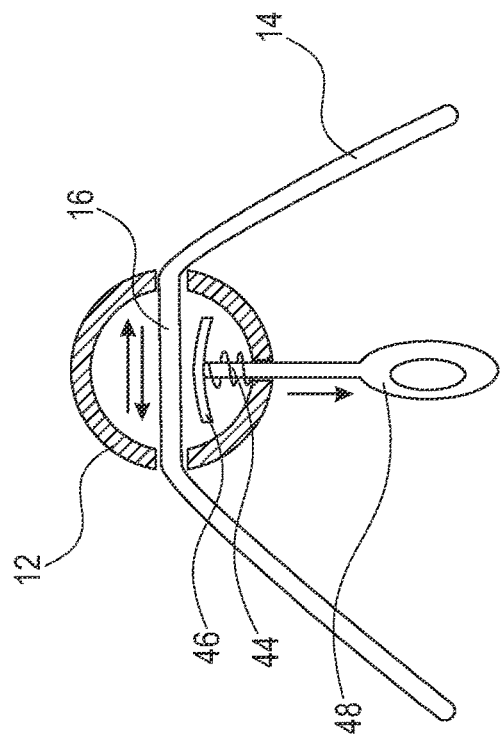
FIGS. 5A and 5B are sectional illustrations of the suspension pole of FIG. 4B according to embodiments of the disclosed technology, in an adjustable cord operative state and in a locked cord operative state, respectively.
Figure 5B:
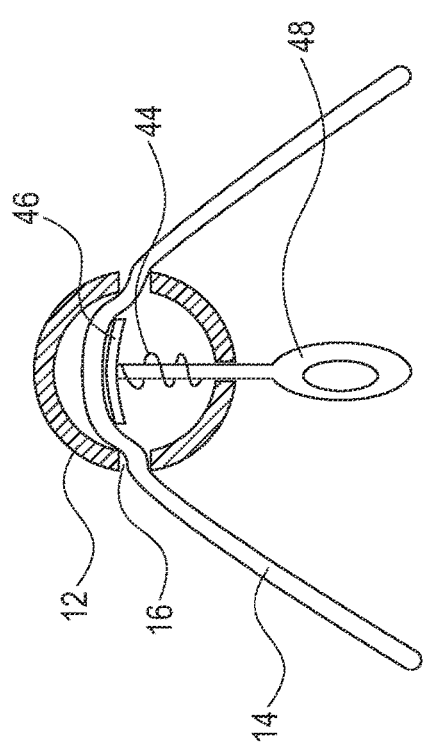

Reference is additionally made to FIGS. 4A and 4B, and to FIGS. 5A and 5B, which show the functionality of plate 46. FIG. 4B is a sectional illustration along the longitudinal axis of suspension pole 12, while FIGS. 5A and 5B are sectional illustrations taken perpendicularly to the longitudinal axis of pole 12.

As seen in FIGS. 4A and 4B, suspension cords 14 extend through bores 16, such that spring loaded plate 46 is disposed under the cords within suspension pole 12. In the embodiment shown in FIGS. 4A and 4B, a pull cord 47 is attached to pull ring 48, to make it easier for the user to pull plate 46 downwardly, away from cord(s) 14, for example when sitting on recliner 10.

As show in FIGS. 4B and 5A, when the user engages pull ring 48 and pulls it downwardly, spring 44 is compressed, and plate 46 moves downwardly away from cord 14. As a result, cord 14 is free to move within bores 16, and the user can adjust the position of recliner 10, for example to transition from an upright position to a reclined position, as shown in FIGS. 1A and 1B. When the user releases pull ring 48, as shown in FIG. 5B, plate 46 is pushed upward under the force of spring and pushes cord 14 upward relative to bores 16. As such, cord 14 is crimped between the internal circumference of suspension pole 12 and plate 46, and its position is locked relative to the suspension pole.

The support surface, on embodiments of the disclosed technology, has a number of relatively rigid support sections with flexible regions between the support sections to allow the angles between adjacent support sections to change easily, such as become more acute while pending or having been bent into a seat from a substantially flat bed configuration. The rigid support sections could be three such sections (for a back, mid-region/torso of the body, and legs) or many such as 10, 12 or more flexible regions adjacent/abutting a non-flexible region, such as a region with padding or air held therein.

In another embodiment inflatable cushions are held within a flexible cover. Valves for the cushions are accessible through apertures in the cover (such as on the rear side), to allow the cushions to be inflated. Alternatively the cushions are individually removable from the cover.

Particular cords connect to such above-described specific regions of the platform, so that movement of one of the regions leads to movement of the other. For example, some cords attach to a furthest flexible region and/or furthest rigid region at an extreme ends the platform 11. Other cords can attach equispaced to each other and/or relative to the ends or a center point of the flat top side of platform 11 when the platform is in a flat bed-like configuration.

In some embodiments, some of the cords may be attached at their ends to particular regions of the platform 11 so that, when an occupant is supported by the platform, the occupant may move one of the relatively rigid support sections, and this leads to corresponding movement of another of the relatively rigid support sections. For example, the platform 11 may have support sections which, in use, are a head section and a leg section, respectively. These regions may be connected by one or more cords 14 such that downward movement of the head section (i.e. rotation of the head section from a more upright position into a less upright position) pulls on the cords 14 and causes the leg section to raise (i.e. to rotate from a more upright position into a less upright position). Both of these motions would tend to move the platform 11 from a sitting position towards a reclined position. Conversely, downward movement of the leg section pulls on the cords 14 and cause the head section to raise. Both of these motions would tend to move the platform 11 from a reclined position to a sitting position. In this way, the occupant can move support sections of the platform with his/her body, in a coordinated manner, to change between various configurations of the platform 11. It is envisaged that these motions may take place without the occupant needing to pull or otherwise manipulate the cords 14 with his/her hands.

Examples of support sections which could be interconnected in this way are: a head section and a leg section; a back section and a leg section; a head section and a lower leg section; a back section and a lower leg section; a head section and an upper leg section; and a back section and an upper leg section.

Returning to FIGS. 2A and 2B, in some embodiments, end portion 40 has secured therein an upward facing mounting structure 50, such as a rod terminating in a mounting ring 52. In some embodiments, end portion 40 has secured therein a downward facing mounting structure 54, such as a rod terminating in a mounting ring 56. Mounting structures 50 and 54 may be used to secure the mounting of suspension pole 12 to anchor 20, or to mount additional components onto the suspension pole, for example as described hereinbelow with respect to FIG. 7.

In some embodiments, first end 43a of end portion 40 may be sealed by an end cap 60. In some embodiments, end portion 40 may include a plurality of bores 62, adjacent second end 43b. Bores 62 are suitable for snap fit engagement of center portion 42, as explained in further detail hereinbelow.

Center portion 42 is tubular, and generally has a similar diameter to that of end portions 40, other than at ends thereof. Ends 70 of center portion 42 have a smaller diameter than that of end portions 40, and have a plurality of push-buttons 72 disposed therein.

When center portion 42 is connected to second ends 43b of end portions 40, ends 70 are disposed circumferentially within second ends 43b, such that push buttons 72 extend through bores 62, and are accessible to the user. For separation of center portion 42 from end portions 40, the user presses in push-buttons 72 while pushing end portion 40 and center portion 42 away from each other, such that push-buttons 72 slip away from bores 62 to enable separation of the center portion from the end portion.

End portions 40 and center portion 42 may have any suitable length, to enable suspension pole 12 to support recliner 10, having a desired width and weight, as well as one or more people using the recliner. In some embodiments, suspension pole 12 is long enough to support a recliner designed for multiple people.

End portions 40 and center portion 42 may have any suitable diameter and any suitable tube thickness. In some embodiments, end portions 40 and center portion 42 may be formed of a 2 mm thick aluminum tube having a 30 mm diameter.

In some embodiments, end portions 40 may be connected directly to each other. For example, one of end portions 40 may be disposed within the other of end portions 40, in a telescoping manner, to enable modification of the length of suspension pole 12.

Figure 3A:
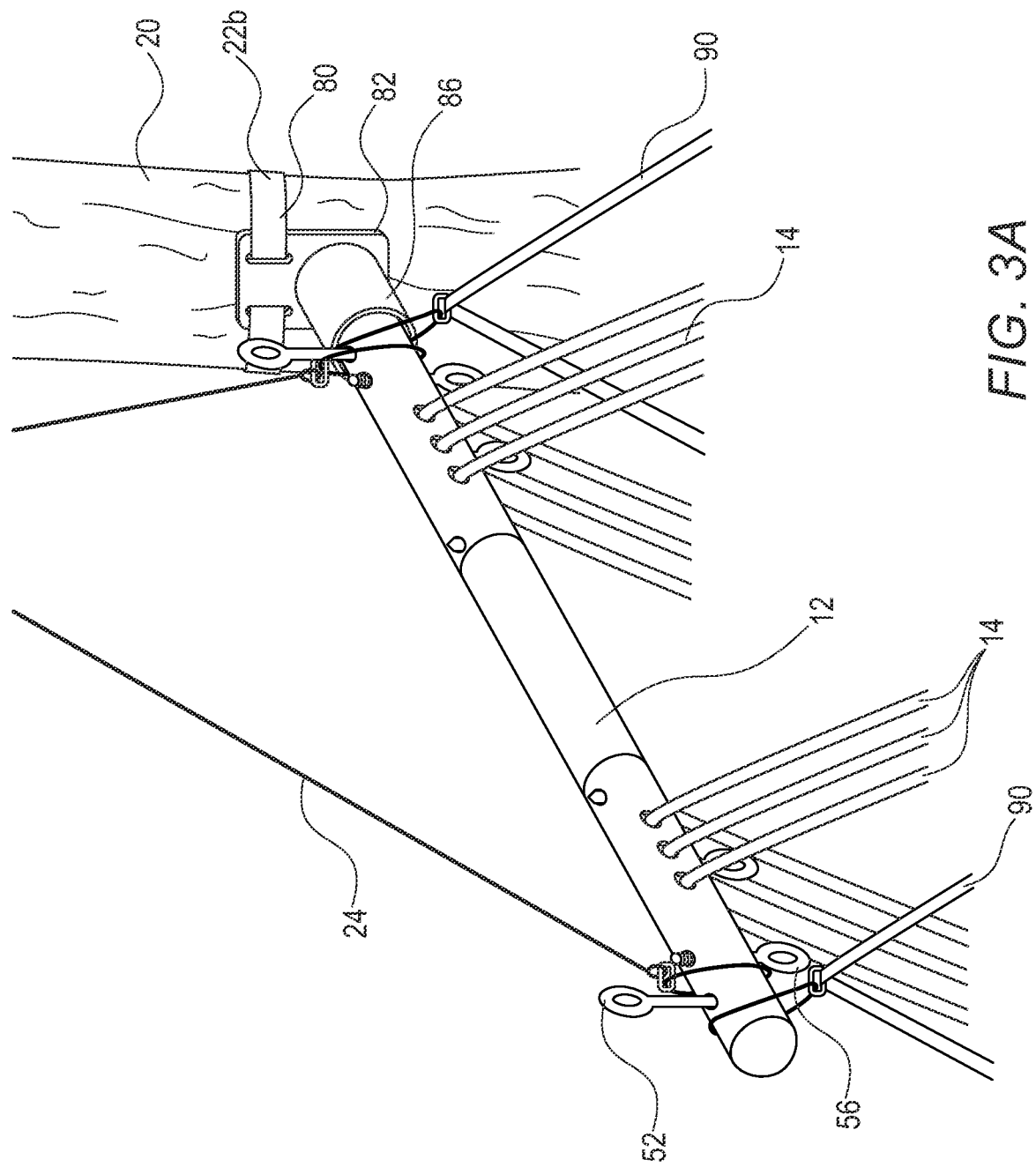
FIGS. 3A and 3B are schematic illustrations of the suspension pole of FIGS. 2A and 2B, attached to an anchor, and having a plurality of suspension cords extending therefrom according to embodiments of the disclosed technology.
Figure 3B:
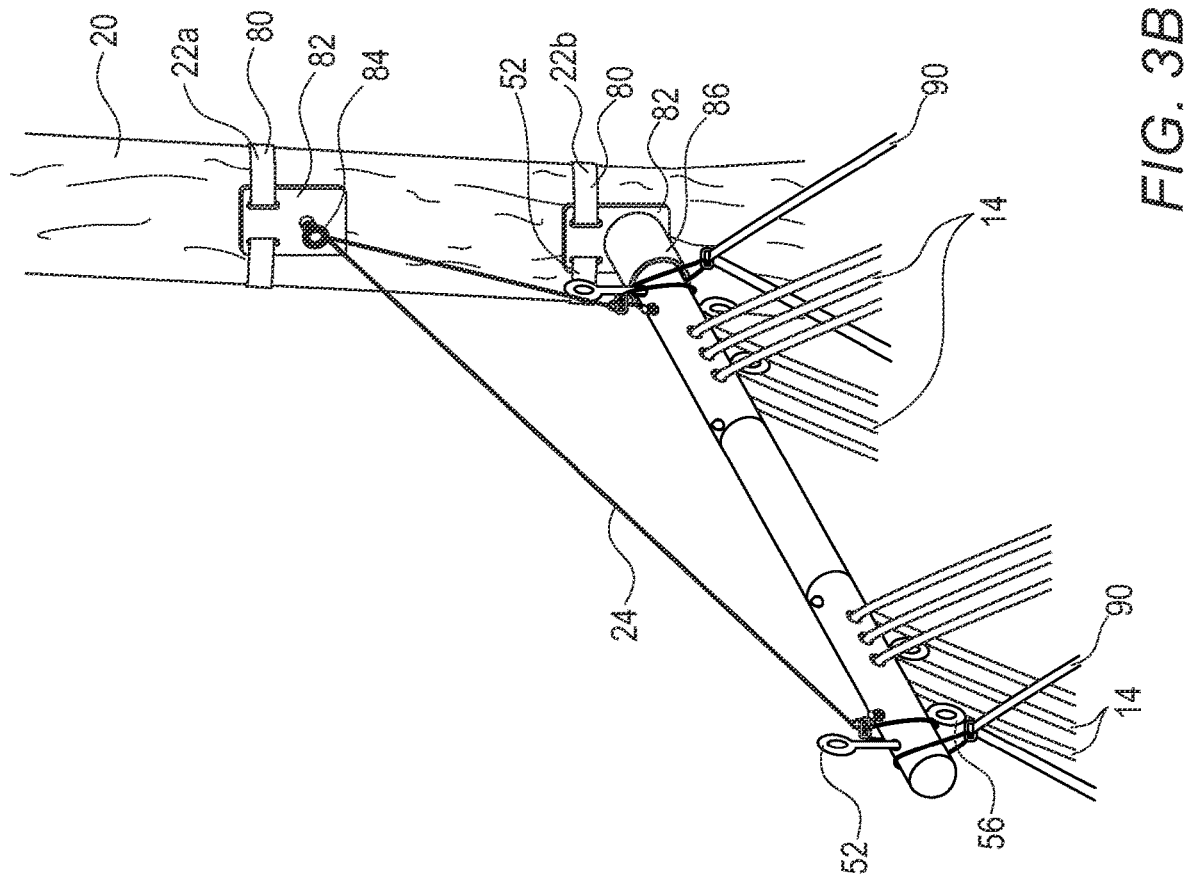

Reference is now made to FIGS. 3A and 3B, which are schematic illustrations of the suspension pole 12, attached to anchor 20, and having a plurality of cords 14 extending therefrom according to embodiments of the disclosed technology.

As seen in FIGS. 3A and 3B, clamps 22a and 22b are mounted onto anchor 20, for example by a strap 80 extending through a plate 82 and wrapped around the anchor.

Clamp 22*a*, which is disposed higher along a longitudinal axis of the anchor, includes a suspension ring 84, through which extends suspension cord 24 holding suspension pole 12. In the illustrated embodiment, suspension cord 24 is wrapped around suspension pole 12 at both ends of the pole. However, in other embodiments, suspension cord 24 may be secured to upward facing mounting ring 52.

Figure 6:
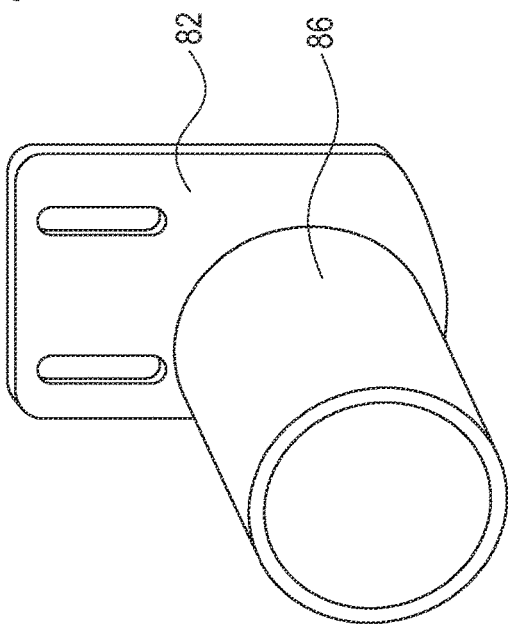
FIG. 6 is a schematic illustration of a guide for mounting the suspension pole of FIGS. 2A and 2B onto an anchor, according to embodiments of the disclosed technology.

Plate 82 of clamp 22*b* has a guide tube 86 extending outwardly therefrom, such that an end of suspension pole 12 is disposed within the guide tube. Plate 82 of clamp 22*b* is shown more clearly in FIG. 6. Typically, the diameter of guide tube 86 is slightly greater than that of suspension pole 12, such that the suspension pole fits into the guide tube with sufficient friction for the pole not to slip out of the guide tube.

Cords 14 extend through bores 16 in suspension pole 12. Additional cords 90 extend from suspension pole 12 near ends thereof. In the illustrated embodiment, cords 90 are wrapped around suspension pole 12. However, in some embodiments, cords 90 may extend through downward facing mounting ring 56.

Figure 7:
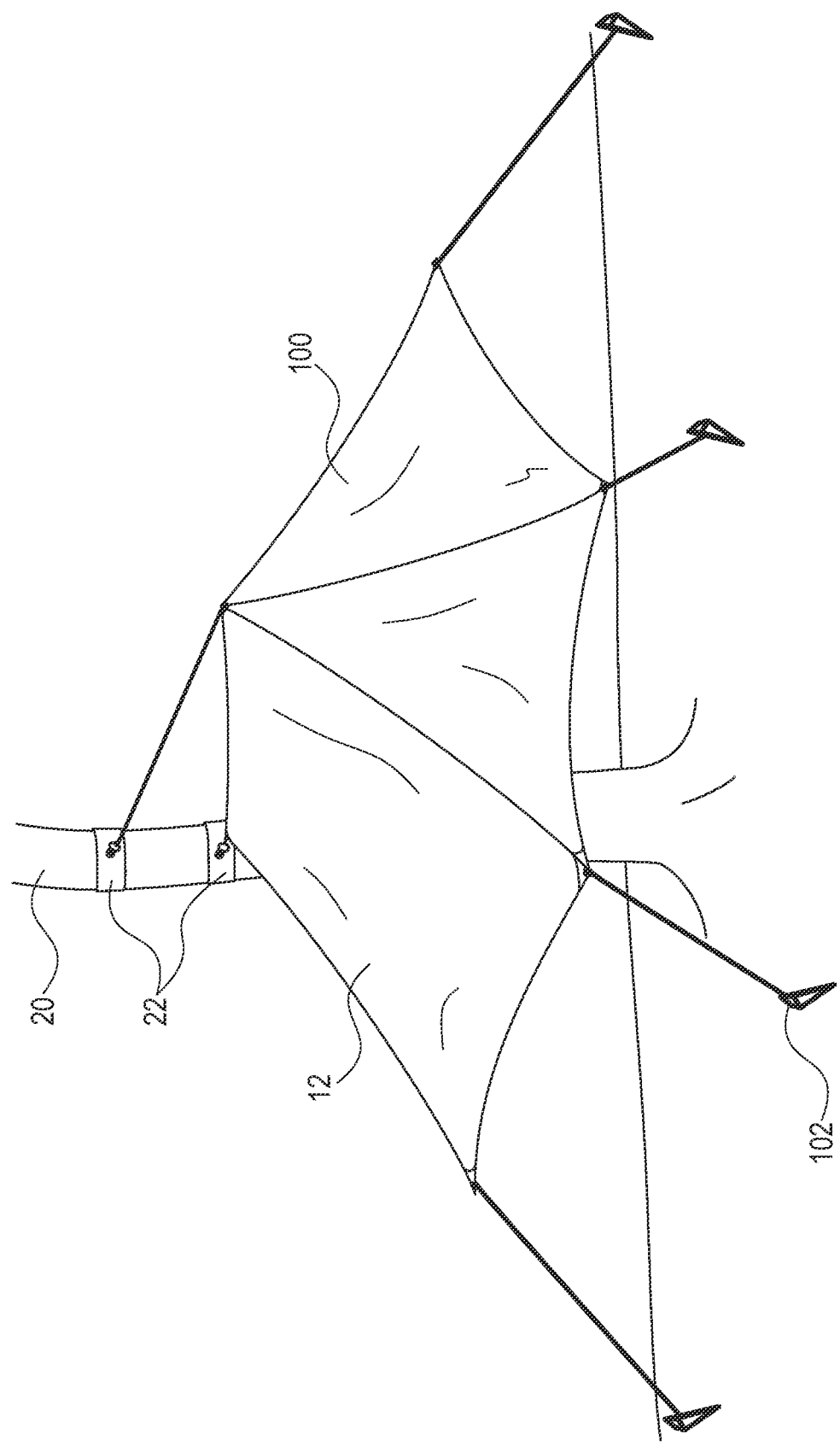
FIG. 7 is a schematic illustration of a tent hanging from the suspension pole of FIGS. 2A to 3B, according to embodiments of the disclosed technology.

Reference is now made to FIG. 7, which is a schematic illustration of a tent or rain cover 100 hanging from suspension pole 12, according to embodiments of the disclosed technology.

As seen, tent 100 is draped over suspension pole 12, which in turn is attached to anchor 20. In some embodiments, tent 100 may be draped over suspension pole 12 when recliner 10 is mounted onto the suspension pole, such that the tent covers and protects the recliner. Typically, tent 100 is draped over an outer circumference of suspension pole 12, as shown in FIG. 7, so as not to disrupt use of cords 14 and adjusting of recliner 10. However, in other embodiments, tent 100 may be attached to downward facing mounting rings 56, or mounted onto suspension 12 is any other suitable manner. In some embodiments, ends of tent 100 may be anchored to the ground, for example using stakes 102, as common in the art of tents.

It should be understood that all subject matter disclosed herein is directed, and should be read, only on statutory, non-abstract subject matter. All terminology should be read to include only the portions of the definitions which may be claimed.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A recliner system, comprising:
   a suspension pole adapted to be mounted onto an upright anchor and to extend outwardly therefrom, the suspension pole adapted to be substantially perpendicular to the upright anchor when mounted thereon;
   a support platform; and
   a plurality of cords, each attached to the support platform at two attachment points and suspended from the suspension pole, wherein the plurality of cords extend through bores in the suspension pole, from one side of the suspension pole to the other, such that a segment of the cords disposed within the suspension pole is substantially perpendicular to the suspension pole,
   wherein the support platform is adjustable between an upright position and a reclined position by pulling on at least a subset of the plurality of cords, and
   wherein the suspension pole comprises a tube having a spring loaded plate disposed therein, the spring loaded plate being adapted to push at least one cord of said plurality of cords past the corresponding bore through which it passes, in a direction perpendicular to a longitudinal axis of the suspension pole, thereby crimping the cord between the spring loaded plate and an internal circumference of the suspension pole.

2. The recliner system of claim 1, wherein the suspension pole is mounted onto the anchor by a guiding tube, attached to a bracket wrapped around the anchor.

3. The recliner system of claim 1, wherein the pulling on the subset of the plurality of cords comprises, for each cord in the subset, changing a ratio between a length of the cord on one side of the suspension pole and a length of the cord on the opposing side of the suspension pole.

4. The recliner system of claim 1, wherein the suspension pole includes first and second end portions, each including some of the bores and having some of the cords extending therethrough.

5. The recliner system of claim 4, wherein each of the first and second end portions is connected to an end of a center portion.

6. The recliner system of claim 5, wherein the center portion is attached to the first and second end portions by snap fit engagement.

7. The recliner system of claim 1, further comprising a handle, functionally associated with the spring loaded plate, wherein, when the user pulls the handle away from the suspension pole, the plate is pulled away from the corresponding bore and the cord is released from the crimping, for adjustment thereof.

8. The recliner system of claim 1, wherein, in the upright position, a back portion of the support platform is substantially perpendicular to a seat portion of the support platform.

9. The recliner system of claim 1, wherein, in the reclined position, the entire support platform is in substantially the same plane.

10. A method of adjusting a position of a support platform of a recliner suspended from a suspension pole by a plurality of cords extending through bores in the suspension pole, the method comprising:
    pulling a handle away from the suspension pole, the handle being functionally associated with a plate securing a position of at least some of the cords relative to the suspension pole, such that the pulling of the handle releases the cords relative to the suspension pole;
    while the handle is pulled away from the suspension pole, pulling on at least one cord of the plurality of cords, to adjust a position of the support platform; and
    releasing the handle, thereby to secure the cords and the support platform in their adjusted position.

11. The method of claim 10, wherein the pulling on the at least one cord comprises adjusting a position of the support platform between a reclined position and an upright position.

* * * * *